United States Patent [19]

Ikezawa et al.

[11] Patent Number: 4,571,842
[45] Date of Patent: Feb. 25, 1986

[54] LENS JUDGING APPARATUS OF LENS METER

[75] Inventors: Yukio Ikezawa; Hisakazu Yoshino, both of Tokyo, Japan

[73] Assignee: Tokyo Kogaku Kikai Kabushiki Kaisha, Tokyo, Japan

[21] Appl. No.: 660,423

[22] Filed: Oct. 10, 1984

[30] Foreign Application Priority Data

Oct. 15, 1983 [JP] Japan .......................... 58-158650[U]

[51] Int. Cl.⁴ ........................... A61B 3/10; G01B 9/00
[52] U.S. Cl. ....................................... 33/200; 33/507; 33/180 R; 356/127
[58] Field of Search .................... 33/200, 507, 180 R; 356/127, 128, 125

[56] References Cited

U.S. PATENT DOCUMENTS 4,098,002  7/1978  Campbell .............................. 33/200
4,182,572  1/1980  Humphrey .......................... 356/127

Primary Examiner—Harry N. Haroian
Attorney, Agent, or Firm—Browdy and Neimark

[57] ABSTRACT

A lens judging apparatus to be used in a lens meter is disclosed. It has at least one projecting device movably mounted on the both sides of a lens table with respect to its elongated direction. The projecting devices are movably arranged within a predetermined range in the traversing direction relative to the elongated direction of the lens table by receiving the respective spectacles hung thereon. It also has a detector for the movement of the projecting member, a device for judging whether the spectacle lens is for the right or left by detecting a signal emitted from the detector, and a display panel showing a character measuring either "right" or "left" based on the result of judgment made by the judging device.

4 Claims, 4 Drawing Figures

F I G. 1
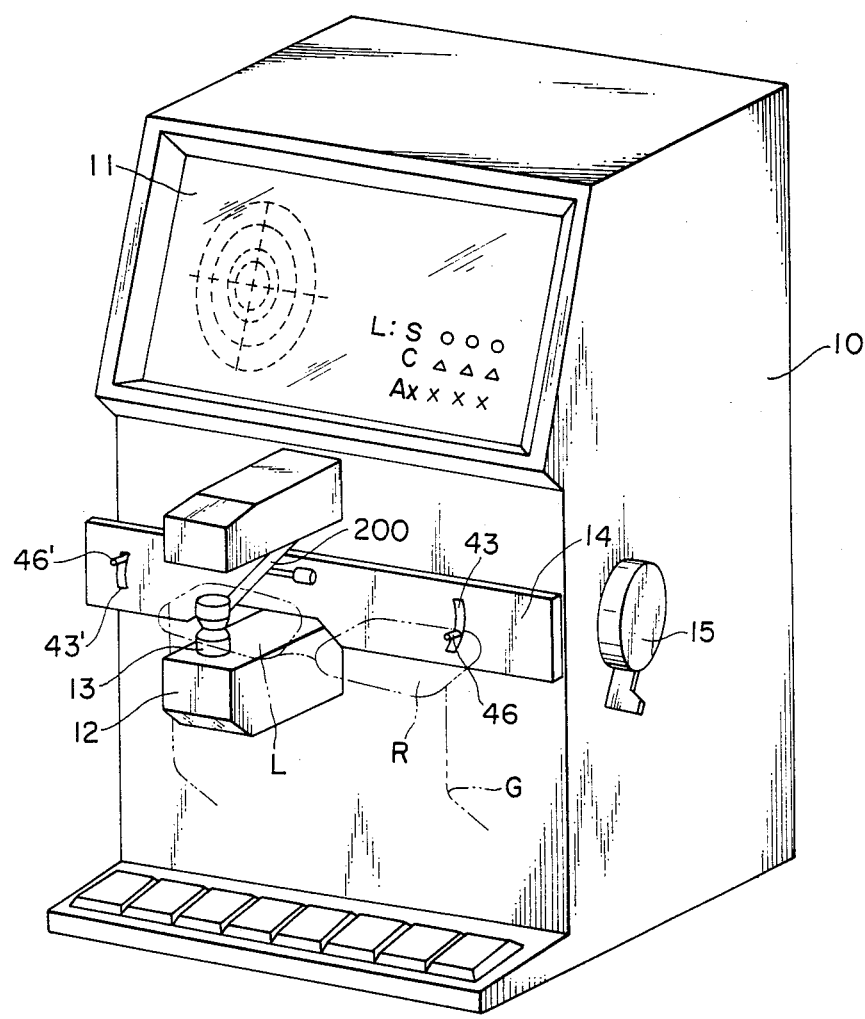

LENS JUDGING APPARATUS OF LENS METER

BACKGROUND OF THE INVENTION

1. Field of the Invention

This invention relates to a lens meter for measuring a refraction characteristic of a lens of spectacles, and more particularly to a lens judging apparatus to be used in a lens meter which automatically judges whether the lens to be measured is a lens for the right eye or left eye at the time when the framed lens of spectacles is to be measured.

2. Description of the Prior Art

A conventional lens judging apparatus of this type is disclosed in U.S. Pat. No. 4,098,002, wherein the apparatus has a lens table adapted to hold a lens to be tested and also to regulate an optical or geometric position. At the both end portions of said table surface, pressure sensitive portions each having a pressure sensitivity responding switch built therein is arranged with a space of about 1.5 times of the front length of the spectacles therebetween, so that when the lens is for the right eye, the frame for the left side lens of the spectacles pressurizes the left side pressure sensitive portion to activate the switch, and on the contrary, when the lens is for the left eye, the frame for the right side lens pressurizes the right side pressure sensitive portion to activate the switch. In this way, the prior art apparatus is designed to automatically judge which side of the lens is going to be measured from the actuation of the pressure sensitivity responding switch.

In such a conventional apparatus, however, such disadvantage is involved as that the measurer is required to constantly hold the spectacles by hand in order to pressurize the pressure sensitive portion with it, since a pressure sensitivity switch is employed and the holding of the spectacles by means of said lens receiving stand and lens table is insufficient.

Furthermore, when the measuring optical axis of the lens meter is aligned with the optical center of the measuring lens, there are some spectacles which are unable to pressure the pressure sensitive portion with the frame of a lens on the side which is not yet subjected to the alignment adjustment because of various reasons in connection with spectacles constitution such as; different configuration of the spectacles frame (particularly, the shape of the front portion thereof) refraction characteristic of a lens to be put in said spectacles frame, inter alia, characteristic of a lens as well as a prism having a specially strong spherical power, a different distance between the optical centers of the right and left lens depending on the pupillary distance of the person who puts on the spectacles. Therefore, the prior art apparatus cannot necessarily be mentioned as a perfectly automatic judging apparatus.

The present invention is accomplished in view of the above.

SUMMARY OF THE INVENTION

It is therefore a first object of the invention to provide a novel and useful lens judging apparatus to be used in a test meter;

A second object of the present invention is to provide a lens judging apparatus to be used in a lens meter, wherein the above-mentioned disadvantage can be removed, so that the measurer is not required to hold and pressurize the spectacles constantly;

A third object of the invention is to provide a lens judging apparatus of a lens meter, wherein alignment adjustment can be made freely.

To achieve the above objects and others, there is essentially provided a lens judging apparatus in a lens meter comprising at least one projecting member movably mounted on the both sides of the lens table with respect to the elongated direction in such a manner as to be movable within a predetermined range in the traversing direction relative to said elongated direction by receiving said respective spectacles hung thereon; means for detecting the movement of said projecting member; means for judging whether the spectacles lens put on said lens receiving stand is for the right or left by means of a detecting signal emitted from said detecting means; and means for informing the results of the judgement made by said judging means to the measurer, in a lens judging apparatus to be used in a lens meter for measuring refraction characteristic of a spectacle lens by holding the spectacles on a lens receiving stand and a lens table with said lens receiving stand arranged generally in the center thereof with respect to the elongated direction.

With the above constitution, according to the present invention, a novel and useful lens judging apparatus in a lens meter can be provided, wherein the lens which is to be measured can be automatically judged whether it is for the right eye or left eye with sure when a lens of spectacles is measured, and wherein the measurer is not required to keep holding and pressurizing the spectacles by hand in that occasion.

Furthermore, a lens judging apparatus in a lens meter is provided in which an alignment adjustment can be made freely, and impossibility of judgement with respect to the lens as well as errors of judgement can be prevented from occuring even if the configuration of the lens is different during an adjusting operation alignment.

Many other advantages and features of the present invention will become manifest to those versed in the art upon making reference to the detailed description and the accompanying sheets of drawings in which a preferred structural embodiment incorporating the principles of the present invention is shown by way of example.

BRIEF DESCRIPTION OF THE DRAWINGS

FIG. 1 is a perspective view showing one example of a lens meter having a lens judging apparatus according to the present invention;

DETAILED DESCRIPTION OF THE EMBODIMENT

Figure 2:
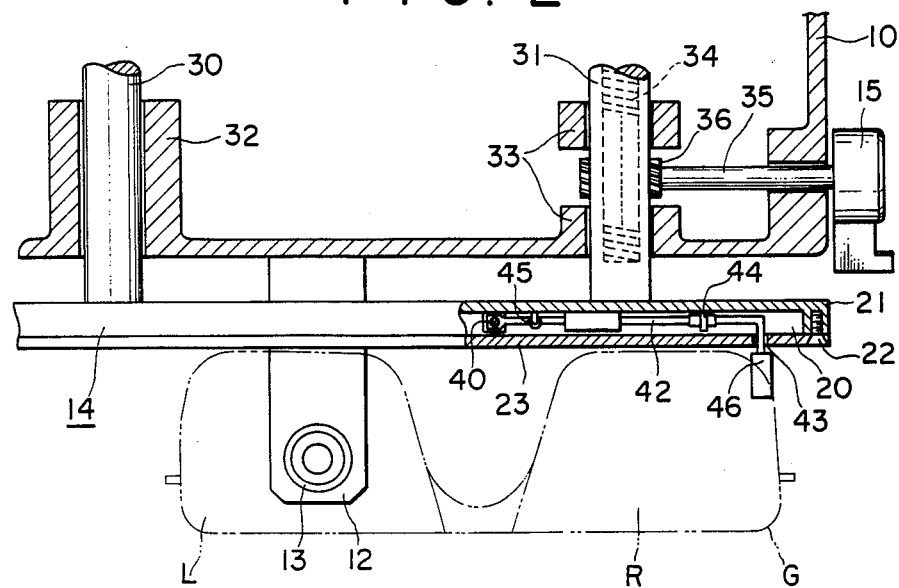
FIG. 2 is a cross sectional view showing a part of the judging apparatus which is material to the present invention.

A preferred embodiment of the present invention will be described hereinafter with reference to the accompanying drawings, wherein like numerals denote like or corresponding parts throughout.

FIG. 1 is a perspective view of an automatic lens meter incorporated with the lens judging apparatus.

This lens meter (not numbered) includes a CRT display portion 11 displaying measuring results of a lens to be tested, state of alignment, cylindrical axial direction, etc. shown by means of devices and values at the upper face of a housing 10; a lens receiving portion 12 with a measuring optical system built-in generally at the central portion of the front face thereof; and a lens receiving stand 13 holding a lens L to be tested and erected upwardly on the lens receiving portion 12. A lens table 14 adapted to cooperate with the lens receiving stand 13 to hold the lens L or spectacles G and to regulate the position thereof is provided in such a manner as to arrange the lens receiving stand 13 to position generally at the center with respect to the elongated direction thereof. The lens table 14 can be moved back and forth by means of rotating a handle 15 mounted on the side face of the housing 10, said elongated direction of the table 14 being made in agreement with the horizontal direction of its table face. This lens meter stores a measuring apparatus of the type as disclosed in, for example, Japanese Laid-open Pat. No. 57(1982)-199933 and can automatically measure the refraction characteristic of the lens L.

FIG. 2 is a cross sectional view of a lens judging apparatus showing only a part thereof which is material to the present invention.

Figure 3:
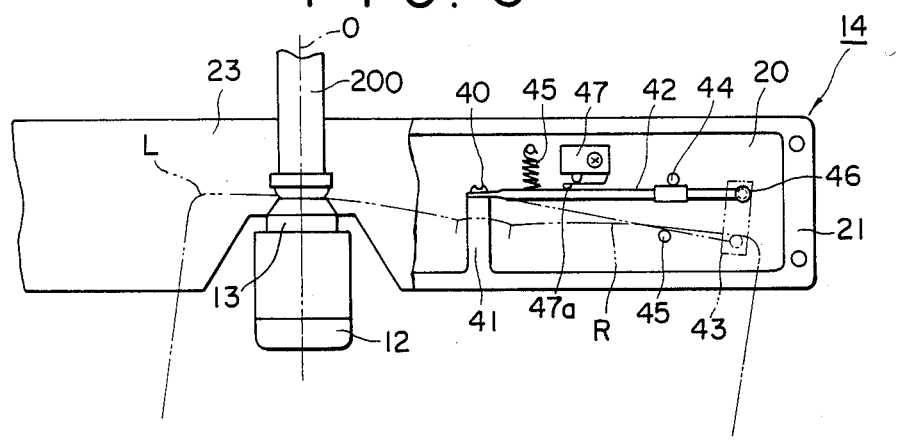
FIG. 3 is a front view partly broken of the judging apparatus.

FIG. 3 is a front view of the above partly broken.

The lens table 14 is formed with a table base 21 having a bore 20 defined therein, and a table upper plate 23 fastened to the table base 21 in a fashion as to cover the bore 20 by a machine screw 22 and served as a table surface. The table base 21 is provided with two shafts 30,31 which are slidably thrusted into bearing portions 32,33 of the housing 10 of the lens meter in the axial direction. On the under-surface of the shaft 31 is mounted a rack gear 34 which meshes with a pinion gear 36 mounted on the tip portion of a rotary shaft 35 of the handle 15. By rotating the handle 15, the shafts 30,31 are moved back and forth, thereby moving the table 14 back and forth.

The table base 21 is provided with a pivotable arm 42 having a spring property within the bore 20 thereof, said arm 42 being fastened at its one end to a pedestal 41 by a machine screw 40. The other end of the pivotable arm 42 is provided with a projecting member 46 bent generally at right angles and projected through an opening 43 formed in the table upper plate 23. Consequently, the projecting members 46,46', at least one each, are provided on the both sides of the lens table respectively with respect to the elongated direction in such a manner as to be movable within a predetermined range in the traversing direction relative to the elongated direction. The pivotal angle of the pivotable arm 42 is restricted by restricting pins 44,45 planted in the table base 21, while the arm 42 is constantly exerted with the rotary face in the counterclockwise direction resisting the gravity by means of the biasing force of the spring 45. The upper side face of the arm 42 is abutted against by a sensing lever 47a of a micro-switch 47 adapted to serve as a detecting means. The micro-switch 47 is arranged as such that when the arm 42 is in a normal position, i.e. when the arm 42 is pulled upwardly by the spring 45 and abutted against the upper side regulating pin 44, it is in the state of "ON".

The above description is made with regard to the right side judging mechanism. Likewise, the apparatus has a left side judging mechanism symmetric to the right mechanism with respect to a measuring optical axis O.

Figure 4:
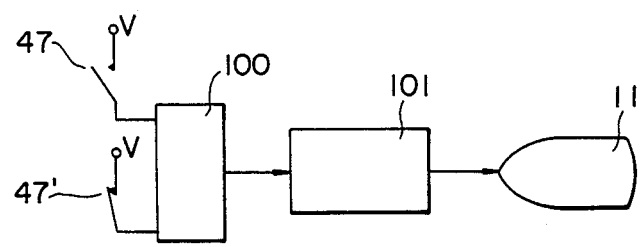
FIG. 4 is a block diagram showing an electric circuit.

FIG. 4 is a block diagram showing an electric circuit of the judging mechanism of the present invention, wherein the micro-switch 47 of the right side judging mechanism as well as the left side judging mechanism is connected with a judging circuit 100. The signal emitted from the judging circuit 100 is inputted into a character display circuit 101. The character display circuit 101 is such constituted as to emit a scanning line signal in order to display a character meaning right or left, such as "R" or "L" on the CRT display panel 11 which together with the character display circuit 101 constitutes an information means.

Function of the present invention will be described next. As shown in, for example, two dots-one dash line in FIGS. 1 through 3, the left side lens L of the spectacles G is put in the measuring optical path. When the left side lens L is to be measured, the right side lens R is hung on the projecting member 46 to pivot the arm 42 clockwise resisting the biasing force of the spring 45 due to its own gravity of the spectacles G. Because of the foregoing, the microswitch 47 which has been kept in the state of "ON" is turned to the state of "OFF". The "OFF" signal emitted from the switch 47 is inputted into the judging circuit 100 and the judging circuit 100 judges that the right side switch is on. Based on the foregoing, the character display circuit 101 is caused to display a character "L" on the CRT display panel 11 informing that the left side lens being tested L is the measuring lens.

In the present embodiment, the measurement of the spectacles G for judging the right or left is vertical within a normal plane, while the movement of the spectacles for adjusting the measuring optical axis in alignment with the optical center of the lens is back and forth within a horizontal plane. The back and forth movement of the spectacles G is caused by the back and forth movement of the lens table 14 due to the rotation of the handle 15. Since the direction for the alignment adjustment and the direction for the right or left judgement are different with respect to each other as seen in the foregoing, an adverse affection on the alignment can be avoided unlike the conventional art in which the detection is made while pressurizing. As a result, a correct judgement can be always ensured.

Furthermore, since the biasing force of the spring 42 is enacted to constantly pull the arm 42 upwardly, this force serves as a supplemental force for holding the spectacles G. Consequently, since it cooperates with the pressure maintaining force of the conventional lens pressure 200 for the lens, even if the measurer should release his holding hand during the measuring operation, the spectacles G can be maintained in its standstill state.

While the present invention has been described with reference to the preferred embodiment, it is to be understood that many changes or modifications may be added without departing from the scope as defined in appended claims.

What is claimed is:

1. In a lens judging apparatus to be used in a lens meter for measuring refraction characteristic of a spectacles lens by holding the spectacles on a lens receiving stand and a lens table with said lens receiving stand arranged generally in the center thereof with respect to the elongated direction, the lens judging apparatus comprising:

at least one projecting member movably mounted on the both sides of the lens table with respect to the elongated direction in such a manner as to be movable within a predetermined range in the traversing direction relative to said elongated direction by receiving said respective spectacles hung thereon;

means for detecting the movement of said projecting member;

means for judging whether the spectacles lens put on said lens receiving stand is for the right or left by means of a detecting signal emitted from said detecting means; and means for informing the results of the judgement made by said judging means to the measurer.

2. A lens judging apparatus as claimed in claim 1 characterized in that the lens receiving stand is arranged in such a fashion as to face a receiving portion thereof upwardly in the normal direction, the table face of said lens table is arranged to be in perpendicular plane and that the elongated direction of said lens table is arranged to be in a horizontal direction.

3. A lens judging apparatus as claimed in claim 1, wherein said projecting member is mounted on the tip portion of a pivotable arm having its pivotal point in the vicinity of said lens receiving stand.

4. A lens judging apparatus as claimed in claim 1, wherein said information means is an image displaying means displaying a character meaning either "right" or "left".

* * * * *